United States Patent [19]
Stibal et al.

[11] Patent Number: 5,656,719
[45] Date of Patent: Aug. 12, 1997

[54] CONDENSATION INJECTION MOLDING PROCESS FOR PRODUCING BOTTLE PREFORMS OF POLYETHYLENE TEREPHTHALATE AND/OR ITS COPOLYESTERS AND RESULTANT PREFORMS

[75] Inventors: Werner Stibal, Trimmis; Werner Kaegi, Domat/Ems; Joachim Ensinger; Klaus Nothhelfer, both of Thusis, all of Switzerland

[73] Assignee: EMS-Inventa AG, Zurich, Switzerland

[21] Appl. No.: 601,580

[22] Filed: Feb. 14, 1996

[30] Foreign Application Priority Data

Feb. 20, 1995 [DE] Germany .................. 195-05-680.9

[51] Int. Cl.[6] .................................................. C08J 3/00
[52] U.S. Cl. .................. 528/491; 528/272; 528/298; 528/301; 528/302; 528/307; 528/308; 528/308.6; 525/437; 264/512; 264/513; 264/516
[58] Field of Search ................ 528/272, 298, 528/301, 302, 307, 308, 308.6, 491; 525/437; 264/512, 513, 516

[56] References Cited

U.S. PATENT DOCUMENTS 4,223,128 9/1980 Halek et al. .

FOREIGN PATENT DOCUMENTS

| | | |
|---|---|---|
| 0269583 | 6/1988 | European Pat. Off. . |
| 0379684 | 8/1990 | European Pat. Off. . |
| 0422282 | 4/1991 | European Pat. Off. . |
| 0541674 | 5/1993 | European Pat. Off. . |
| 4309227 | 5/1994 | Germany . |
| 94/17122 | 8/1994 | WIPO . |

OTHER PUBLICATIONS

Furst, A. "Devolatilizing in the course of Poly–Condensation." Proceedings to the Devolatilizing in the Course of Producing and Processing Plastci Materials. pp. 187 and 192 (1992).

Merlini, M.S. "Industtrial Processes for Producing Bi–Oriented Hollow Bodies." Plastics, vol. 3, pp. 17–20 (1983).

*Primary Examiner*—Samuel A. Acquah
*Attorney, Agent, or Firm*—Browdy and Neimark

[57] ABSTRACT

A process for producing bottle preforms from the melt of polyethylene terephthalate and/or its copolyesters, includes selectively introducing an inert gas into the continuous flow or partial flow of the polyester melt from a polycondensation having an intrinsic viscosity between 0.5 and 0.75 dl/g, subsequently bringing the melt to an acetaldehyde content below 10 ppm in a melt after-condensation reactor and to an intrinsic viscosity of 0.75 to 0.95 dl/g and thereafter guiding the melt into an injection molding tool and processing same.

21 Claims, 2 Drawing Sheets

CONDENSATION INJECTION MOLDING PROCESS FOR PRODUCING BOTTLE PREFORMS OF POLYETHYLENE TEREPHTHALATE AND/OR ITS COPOLYESTERS AND RESULTANT PREFORMS

FIELD OF THE INVENTION

The invention relates to the preparation of polyester preforms for use in blowing bottles, and such preforms; and, more particularly, to a condensation injection molding process for making such preforms.

In particular, the invention relates to a condensation injection molding process, i.e. an "in line" process, for producing bottle preforms from the melt of polyethylene terephthalate (PET) and/or its copolyesters (CoPET) for producing bottles which are intended to be used in the food industry. These bottles are particularly intended for containing beverages, preferably sweetened beverages containing carbon dioxide.

The invention furthermore relates to preforms which can be produced by means of the above mentioned process and which have a particularly low acetaldehyde content.

BACKGROUND OF INVENTION

The acetaldehyde content of polyester beverage bottles is of particular importance. Acetaldehyde is created in small amounts due to a thermal decomposition reaction. When using polyester for foodstuff packaging, in particular in connection with bottled beverages, traces of acetaldehyde are bothersome, because acetaldehyde, which is a very odor- and taste-intensive substance, noticeably changes the taste. An acetaldehyde concentration of 3 µ/l, measured in the gas content of a newly produced closed polyester bottle after 24 hours, was set as the upper acceptable limit by the Coca Cola Company (Coca Cola standard.)

To meet these requirements, i.e. reduce the level of acetaldehyde to an acceptable level, it has been necessary in accordance with the prior art to subject the raw polyester initially produced in the melt phase to a special solid phase treatment.

This state of the art is described in the conference proceedings to "Entgasen beim Herstellen und Aufbereiten von Kunststoffen" [Devolatilizing in the Course of Producing and Processing Plastic Materials] in an article by A. Furst "Entgasen bei der Polykondensation" [Devolatilizing in the Course of Poly-Condensation], pp. 187 and 192, VDI-Vedag GmbH, publ., Düsseldorf, 1992. The conventional route via the solid phase includes the steps of granulation of a medium-viscous melt, crystallization of the amorphous polyester granules and solid phase poly-condensation in order to obtain granules with a higher viscosity suitable for bottle production and a low acetaldehyde content (in the range of approximately 1 ppm).

Besides the fact that with the conventional process the heat content of the polyester is lost twice so that energy requirements are high, the solid phase treatment is demanding and expensive because of the stickiness problem. The crystallization in particular of copolyesters preferred for bottle production, which tend to stick together even more strongly than normal (homo-)PET, requires special methods and devices. An example of this is provided in EP 0 379 684 B1, wherein two fluidizing devices are used. But even in a conventional solid phase polycondensation reactor, which is operated at even higher temperature than the crystallizer, there is no immunity against stickiness which can lead to a stoppage of the plant. Proposals for overcoming this problem have been made, for example, in EP 0 269 583 B1 and in WO 94/17122. It is furthermore proposed in EP 0 541 674 B1 to give the granules a cross-sectional "dog bone" shape, based on the conside-ration that granule bodies of such shape can only touch at a few points and that thereby the danger of agglomeration is reduced during solid state treatment.

In accordance with the above process it is therefore possible to produce bottle granules (bottle-grade chips). It is then necessary to transport these granules to the producer of preforms or bottles.

The production of the bottle from the bottle-grade granules takes place in two process steps, such as described, for example, in "Industrielle Verfahren zur Herstellung biorientierter Hohlkörper" [Industrial Processes for Producing Bi-Oriented Hollow Bodies] by M. S. Merlini in Kunststoffe/Plastics 3/83, pp. 17 to 20. The solid-phase post-condensed polyester granules are added in the first step, since they have again absorbed moisture during the delivery, are next melted in the extruder of an injection molding machine and pressed into the cavities of the injection molding tool, whereby preforms of the subsequent bottles are obtained. In the second process step the preforms are stretch-blow molded at approximately 100° C. and bi-axially (radially and axially) oriented during blow-up, thus giving the finished bottle the required use properties. These two process steps can usually be performed completely separately, between which steps the preforms are completely cooled.

During melting of the granules in the injection molding extruder, the acetaldehyde content in the polyester again increases because of shearing action and high temperatures, because some thermal decomposition and thus new formation of acetaldehyde will take place. With optimally adjusted extruders and injection molding units, the extent of this new formation of acetaldehyde increases by approximately 5 ppm which, together with the initial value of the bottle-grade granules (approximately 1 ppm) results in an acetaldehyde content in the preform of approximately 6 ppm. An approximately proportional correlation exists between the acetaldehyde content in the preform and the acetaldehyde concentration in the finished bottle. With 1.5 liter disposable bottles (of a weight of approximately 48 g), experience has shown the following relationship to apply: acetaldehyde concentration in the finished bottle (expressed in µg/l, related to the gas volume respectively the contents of the bottle)=0.3×the acetaldehyde content in the preform (expressed in ppm, related to the mass of the polyester). This means that from a preform with 6 ppm acetaldehyde content a corresponding value in the bottle of approximately 1.8 µg/l can be expected. Looked at in the opposite way, the acetaldehyde content in the preform must not be higher than 10 ppm in order not to exceed the Coca Cola limit of 3 µg/l.

Efforts have lately been made with respect to attempting to simplify the previously mentioned solid phase post-condensation of the granules used to injection mold the preform, again in order to reduce the acetaldehyde to an acceptable level.

EP 0 422 282 A1 describes a process wherein the dianhydride of an aromatic tetracarboxylic acid, preferably pyromellitic acid dianhydride, is metered and worked into a melt of PET or CoPET. The granules produced from this process show a very rapid increase of the intrinsic viscosity (I.V.) at relatively low temperatures during a solid phase poly-condensation. Because of this result it is possible to do without a solid phase reactor as previously mentioned. However, the granules still must be crystallized and dried, and the dianhydride has the further undesirable side effect that the second carboxyl groups, released after the addition reaction to the anhydride groupings, can lead at least partially to branching in a subsequent reaction, which worsens the flow properties of the melt during injection molding.

DE 43 09 227 A1 describes a process wherein, as above, the entire solid phase treatment can be performed in air because of the use of lower temperatures. In this case it was possible to reduce the process temperatures to within 185° to 190° C., because a finer than usual granulation is performed and the shorter diffusion paths or the greater specific surface result in a viscosity increase at lower temperatures and in an extensive removal of the acetaldehyde. This process is cumbersome and clearly of a longer duration than the conventional solid phase treatment and in addition, under the applied conditions of 14 hours in the air at temperatures up to 190° C. (or 225° C.), the granules are already being oxidatively attacked.

SUMMARY OF INVENTION

It is therefore an object of the invention to provide a novel process for producing bottle preforms from the melt of polyethylene terephthalate and/or its copolyesters, so that preforms can be produced which have an exceptionally low acetaldehyde content and wherein the prolonged process steps in accordance with the prior art can be avoided.

This object is attained by means of a condensation injection molding process for producing bottle preforms from the melt of polyethylene terephthalate and/or its copolyesters, wherein an inert gas is optionally introduced into the continuous flow or partial flow of the polyester melt from a poly-condensation having an intrinsic viscosity between 0.5 and 0.75 dl/g, subsequently the melt is brought to an acetaldehyde content below 10 ppm, preferably less than 5 ppm, under vacuum at a temperature range between 285° to 260° C. in a melt post-condensation reactor and to an intrinsic of 0.75 to 0.95 dl/g, over a residence time of less than 60 min., and is immediately thereafter guided, if required by means of a conveying device, into an injection molding tool and processed into preforms.

BRIEF DESCRIPTION OF THE DRAWING

The process in accordance with the invention will be explained in more detail below, making reference to the drawings, wherein.

DETAILED DESCRIPTION OF EMBODIMENT

Figure 1:
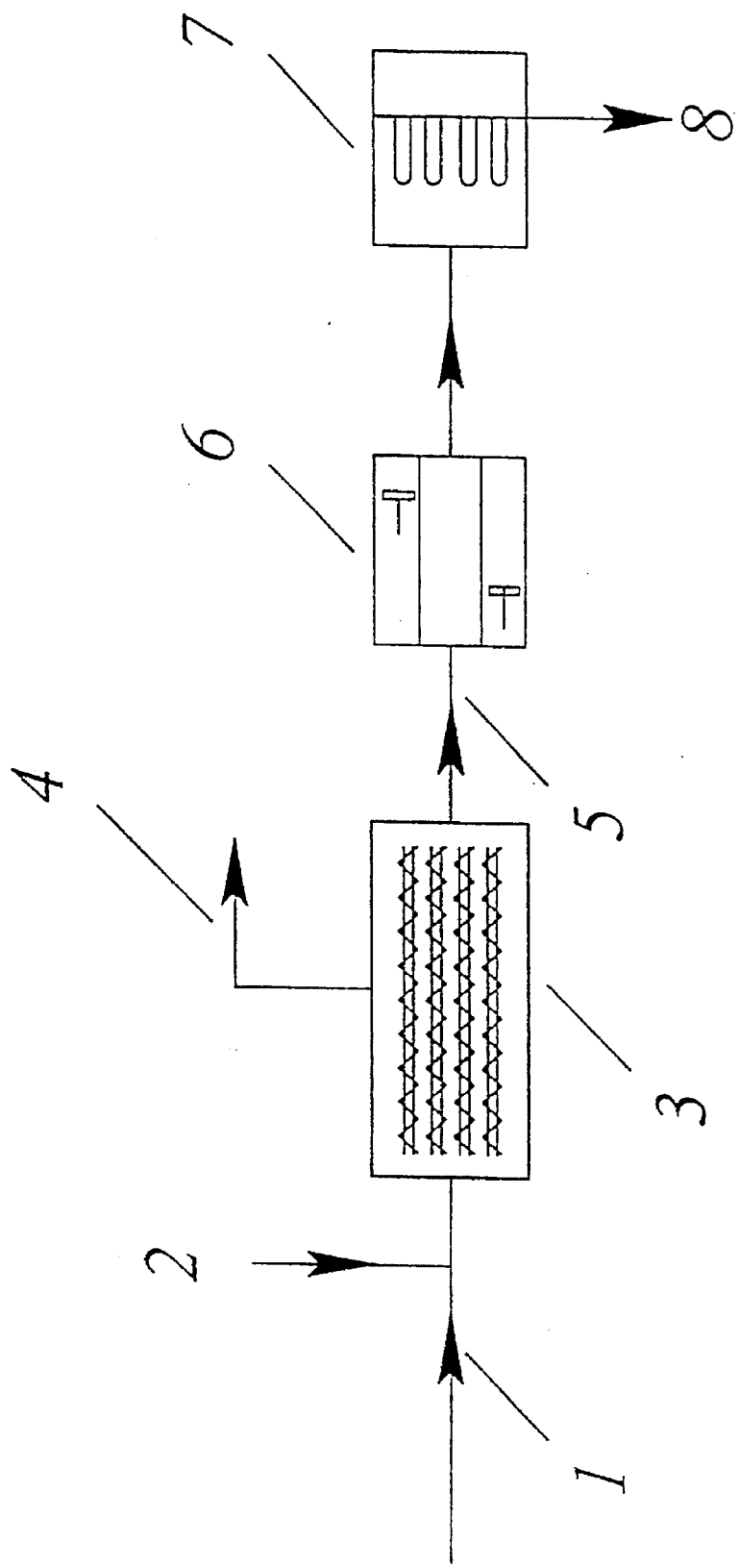
FIG. 1 represents the process in accordance with the invention for the direct production of polyester bottle preforms from the melt (without any detour via the solid phase).

Thus the invention relates to a condensation injection molding process for producing bottle preforms from the melt of polyethylene terephthalate and/or its copolyesters, i.e. a so-called "in line" process for the production of bottle preforms is made available for the first time. In accordance with the process aspects of the invention, an inert gas is optionally introduced into the continuous flow or partial flow of the molten polyester mass from the poly-condensation, which has an initial intrinsic viscosity between 0.5 and 0.75 dl/g, then the melt is brought to an acetaldehyde content below 10 ppm under vacuum at a temperature between 285° and 260° C. in a melt post-condensation reactor and to an intrinsic viscosity of 0.75 to 0.95 dl/g over a residence time in the reactor of less than 60 min., and the resultant product is immediately thereafter guided into an injection molding tool and processed into preforms. In a preferred embodiment it is possible to bring the acetaldehyde content to below 5 ppm.

In another embodiment the melt flow can be guided into an injection molding tool by means of a conveying device. In connection with this conveying device it is possible to advantageously employ a device with a double piston system. The melt post-condensation reactor preferably is a screw post-condensation reactor with at least two screw shafts. The screw rpm are matched to the process conditions and can also be different, depending on the type of extruder used.

In the process of the invention, copolyester with maximally 10 mol-%, preferably 2 to 5 mol-%, of co-monomers is used, wherein the co-monomers are selected from lactones, isophthalic acid, naphthalene-2,6-dicarboxylic acid, 1,4-cyclohexane dimethanol and diethylene glycol. Caprolactone is a particularly preferred co-monomer.

In a special embodiment the temperature range between 285° to 260° C. is traversed descendingly, i.e. the temperature starts at or near 285° C. and becomes less during the reaction, preferably progressively, and ends at or near 260° C. The residence time in the reactor usually is less than 60 min, wherein reaction times of less than 40 min. are preferred. The vacuum in the reactor is maintained below 1 mbar.

For the additional extraction of the acetaldehyde content, it is possible to also introduce an inert gas, such as carbon dioxide in the supercritical state, or nitrogen.

Preforms with an acetaldehyde content of maximally 10 ppm can be produced by means of the process in accordance with the invention.

It has now been surprisingly noted that by means of the process in accordance with the invention, i.e. by bypassing the granule stage, it is possible to injection-mold preforms directly. These preforms produced in accordance with the invention have an acetaldehyde content of less than 10 ppm and therefore meet the Coca Cola standard. This very simple and direct production process—with strict adherence to time and temperature reaction parameters—quickly leads to the goal and therefore bypasses the numerous and lengthy process steps in accordance with the previously described prior art.

With reference to FIG. 1, the reference numerals indicate:

1 The melt flow of polyester with a "normal" intrinsic viscosity, i.e. corresponding to textile quality, coming from a continuous poly-condensation plant, preferably a co-polyester based on polyethylene terephthalate, which "normal" intrinsic viscosity is usually 0.5 to 0.75 dl/g, as indicated above.

2 The optional introduction of an inert gas into the melt flow 1.

3 A continuously operating screw post-condensation reactor for increasing the intrinsic viscosity to 0.75 to 0.95 dl/g, with simultaneous acetaldehyde removal to the greatest extent.

4 A connection to a vacuum system for the removal of the volatile reaction products.

5 A melt flow of bottle intrinsic viscosity and low acetaldehyde content (approximately 5 ppm or less).

6 Device for the continuous removal of the melt flow 5 and charging the injection molding tool 7, for example a double piston system.

7 An injection molding tool with cavities for bottle preforms.

8 Removal of the bottle preforms (acetaldehyde content less than 10 ppm).

The polyester flow 1 consists of polyethylene terephthalate (PET) and/or copolyesters (CoPET) preferably based on it, which usually contain 2 to 5 mol-%, maximally up to 10 mol-%, of co-components (co-monomers). Arbitrary suitable di-functional co-monomers are preferred. However, for the application as bottles, isophthalic acid and naphthalene-2.6-dicarboxylic acid (or their methylesters) are especially used, as well as 1,4-cyclohexane dimethanol and diethylene glycol, or lactones, in particular caprolactone.

A larger devolatilizing surface because of bubble formation is achieved during the subsequent expansion in the reactor 3 by means of introducing an inert gas (nitrogen, argon, helium or carbon dioxide) into the melt mass 1, as well as a reduction of the partial pressure of the volatile reaction products in the gaseous phase, which increases the reaction rate. If carbon dioxide is introduced under such a condition that it is in the supercritical state in the melt between the metering point and the expansion point when entering the reactor, i.e. the temperature is higher than 31° C. and the pressure greater than 73.8 bar (7.38 MPa), it is possible to additionally use an extractive effect on the acetaldehyde. This effect is novel for the treatment of PET and CoPET in the liquid-molten state and was not previously described. Inert gas is preferably introduced into the melt at a ratio to the polyester of approximately 5 standard cubic meters of the inert gas per ton of the polyester (5 $m^3_n$/t).

The post-condensation reactor 3 preferably has at least two screw shafts in the processing chamber. These screws preferably are in close engagement with each other and rotate in the same direction. Satisfactory self-cleaning and a controlled axial conveyance of the entire melt is achieved by means of this arrangement, which is equivalent to a narrow residence time spectrum. Suitable types of the reactor 3 are two- or multi-screw extruder reactors with efficient vacuum devotalization, for example from the ZR series of Werner and Pfleiderer, or from the MSE series of Berstofff.

Also important is a satisfactory accessibility for the vacuum in the entire process chamber, which is possible by means of an appropriate reactor design. The vacuum at the devolatilizing connector should preferably be less than 1 mbar abs. In addition, a rapid reaction and acetaldehyde removal to a large extent is achieved by a large amount of surface restoration which, however, must take place gently in order to prevent thermal damage because of too extensive shearing action. The optimum value lies at an appropriately selected screw rpm. The average residence time of the melt in the reactor is less than 60 min, preferably less than 40 minutes. To match this residence time, small screw pitches and/or single- or two-thread screws are selected. The temperature, which preferably lies in the range between 260° and 285° C., has also a great effect on the polycondensation and the course of the acetaldehyde content. A high temperature is better for rapid poly-condensation (viscosity generation), a low temperature is better for a low acetaldehyde content, i.e. minimization of the new formation of acetaldehyde being created by thermal damage. For this reason it is advantageous to pass descendingly through the preferred temperature range in the reactor.

Acetaldehyde concentrations in the emerging melt of less than 5 ppm can be achieved with suitable reactors and optimized process conditions which, with a new formation of maximally 5 ppm on the way to the injection mold cavity, results in preforms with less than 10 ppm of acetaldehyde content, which are therefore suitable for subsequent filling with beverages. With the process of the invention, the new formation of acetaldehyde is even less in comparison with the present-day processes because of the omission of the re-melting process with its intensive shearing action. Novel and unobtainable up to now by the prior art is the low acetaldehyde content, which is extremely low for a polyester obtained through a melting treatment, on the order of 5 ppm or less downstream of the reactor. In accordance with the prior art, the acetaldehyde content of amorphous (not treated in a solid phase) granules lies at approximately 35 to 70 ppm, and even in the best case and measured directly at the reactor outlet, only acetaldehyde values of more than 10 ppm were reported up to now (for example, see DE 43 09 227 A1).

The device 6 must be matched to the other two main devices in such a way that the melt leaving the reactor 3 is continuously removed and is subsequently supplied to the injection molding tool 7 in a periodic manner in the injection molding cycle. An appropriate double-piston system is suitable for this.

Finally, the injection molding tool 7 is of the same type that is also used as a basic component in known injection molding systems which start with commercially available bottle-grade granules.

Figure 2:
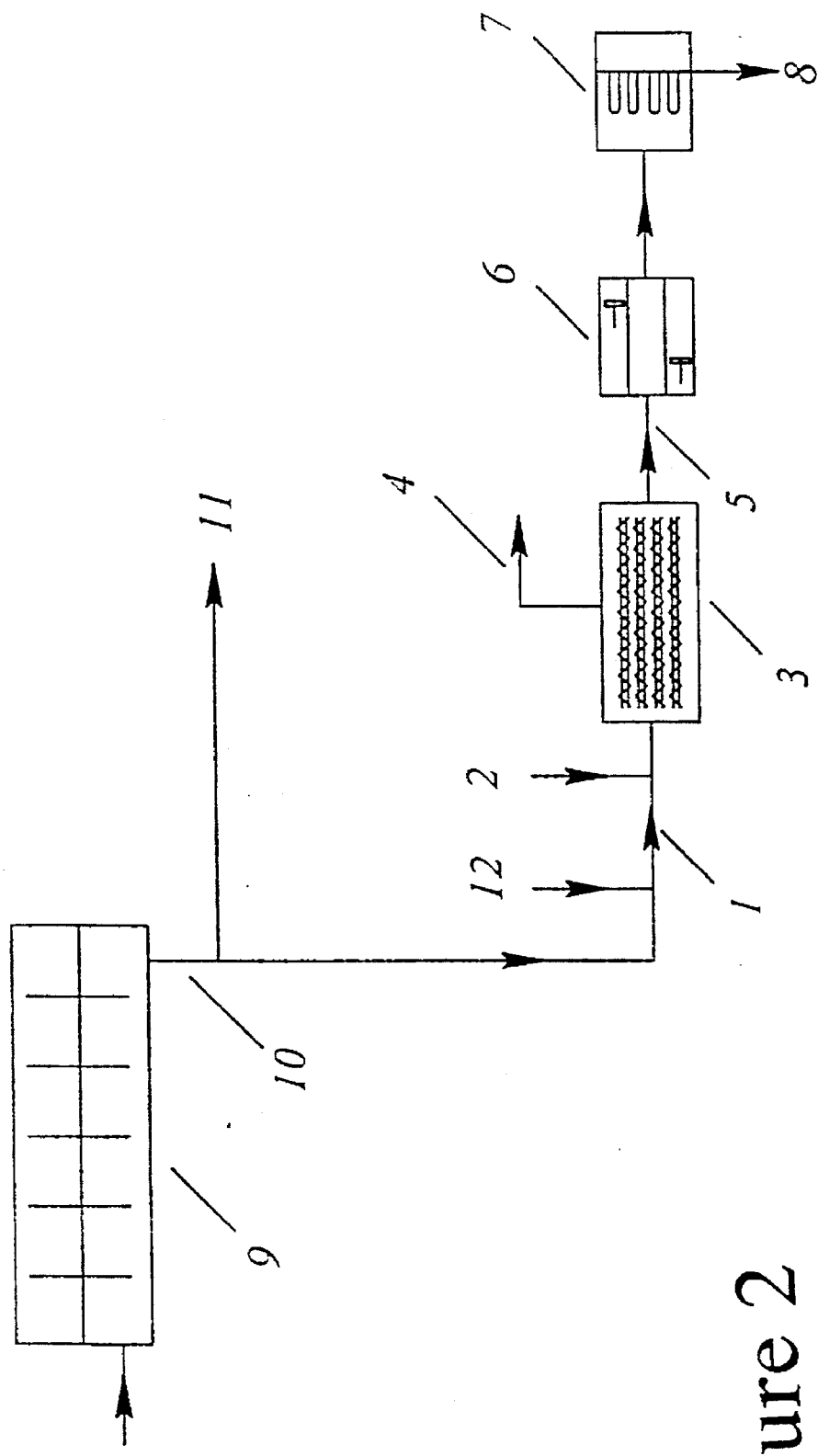
FIG. 2 is a schematic flow chart of a second embodiment.

A particularly advantageous embodiment of the process of the invention is the use of a partial flow of polyester for textile applications from a conventional polycondensation installation with a higher throughput, as schematically represented in FIG. 2. There, 9 represents the end reactor of a continuous polyester plant of a greater capacity which, for example, produces polyethylene terephthalate (PET) of a "textile" I.V. value, i.e. with a value between 0.5 and 0.75 dl/g. The reference numeral 10 identifies the flow of PET melt leaving the end reactor 9, which must still be free of pigment at this location. A partial flow 11 (larger as a rule) is branched off the total flow 10 for textile use, i.e. the production of fibers or filaments. This melt flow must still be matted prior to spinning, for example in accordance with the process described in DE 4 0 39 857 C2.

The other partial flow 1, analogous to the flow 1 of FIG. 1, is then supplied to the process in accordance with the present invention for the production of preforms. However, since CoPET is preferably used in place of PET for beverage bottles, this provides an advantageous opportunity to change this partial PET flow into a CoPET melt with properties advantageous for the preform production by the addition of a co-monomer 12 in accordance with the process described in DE 44 29 524.3. By means of this integrated total concept it is possible to produce bottle preforms in the most direct way in an elegant manner and with extreme efficiency. It is possible to save energy, investments and transport distances.

A further advantageous embodiment variant consists in extruding the melt continuously leaving the reactor 3 to form a tube with the interior and exterior diameter of the cylindrical part of a preform, to cut it into tube segments and subsequently to form a bottom and a thread on the segments. The advantage of this process variant lies in an even shorter residence time of the melt after the reactor 3.

The decisive polyester properties were determined in accordance with the following methods in the exemplary embodiments below:

Intrinsic viscosity was determined by measuring the relative solution viscosity R.V. in a solvent mixture consisting of equal mass portions of phenol and 1,1',2,2'-tetrachloroethane. The polyester concentration C was 0.5 g/dl, the measuring temperature 20° C. Conversion to I.V. was performed by means of the equation of Huggins, wherein $K_H=0.35$:

$$I.V. = \frac{\sqrt{1+4K_H(R.V.-1)} - 1}{2K_H \cdot C} = \frac{\sqrt{1+1,4(R.V.-1)} - 1}{0,35} \quad (dl/g)$$

To determine the acetaldehyde content (the physically bound acetaldehyde present in the free form is meant), the polyester material was first cooled in liquid nitrogen and then ground with the addition of liquid nitrogen. 1.0 g of the sieve fraction between 0.25 and 1.0 mm was weighed into a 15 ml glass vial rinsed with nitrogen, and the vial was sealed with a septum and an aluminum cap and subsequently maintained at 140° C. for 1.5 hours. Following cooling to room temperature, the acetaldehyde content in the gaseous phase of the vial was measured by means of a gas chromatograph with a head space device and converted to the sample weight.

EXAMPLE 1 TO 16

These tests were performed in a melt post-condensation reactor of the type ZR 80 of Werner & Pfleiderer. This reactor has two single-thread screws turning in the same direction and meshing with each other and a vacuum chamber over the entire length. The basis was commercially available textile PET granules (micro-dull) of an I.V. value of 0.673 dl/g. They were dried and melted in a single-screw extruder. The melt supplied to the ZR 80 had an intrinsic viscosity of 0.647 dl/g. The process parameters were varied and optimized in different examples, which are set forth in Table 1 below. The vacuum was kept constant at 0.5 mbar. The treated melt was removed by means of a gear pump and was granulated. The product quality was determined by analysis of amorphous granule samples.

In the first four examples relatively normal conditions in comparison to known end reactors were employed, i.e. temperatures up to 285° C. and comparatively low screw rpm. While Example 1 still resulted in an acetaldehyde content of the usual magnitude of approximately 30 ppm, markedly lower values could be obtained in Example 2 to 4 by increasing the rpm and/or increasing the residence time which, however, stagnated at 11 ppm. The intrinsic viscosity of Examples 3 and 4 was in the correct range for use with bottles.

In the group of Examples 5 to 10, with a constant residence time of 33 minutes, the temperature level was lowered and the rpm range was increased. This led to unexpected and surprising results: in Example 5 the acetaldehyde content, compared with Example 2, at first was still higher (contrary to expectation), but a further increase of the rpm resulted in a sensational improvement of the acetaldehyde content to 4 ppm and lower. No reports are known regarding such low acetaldehyde values in amorphous granules, so that up to now nobody thought it possible to obtain polyester bottles without a solid phase treatment. At higher screw rpm and an appropriate surface restoration in a gentle manner it is apparently possible to remove the acetaldehyde very effectively. The effect of the temperature guidance was also visible: surprisingly, a temperature profile descending to the same end temperature (at the same end viscosity) provides a tendency to lower acetaldehyde values than a rising profile.

In the group of Examples 11 to 16, wherein the residence time was increased to 52 minutes because of the intrinsic viscosity, the complex interrelationships became clear: with a rising temperature profile (examples 11 to 13) the effect of the screw rpm was reversed in respect to the previous examples, so that therefore the acetaldehyde content was higher with high rpm.

With a descending temperature profile the acetaldehyde content at low rpm was unexpectedly high, but improved abruptly at high rpm to 4.2 ppm. The melt of Example 16 was therefore suitable for producing preforms from the view of its acetaldehyde content as well as ist intrinsic viscosity.

TABLE 1

| | ZR80-Process Parameters and Granule Quality | | | | | | | | | | | | | | | |
|---|---|---|---|---|---|---|---|---|---|---|---|---|---|---|---|---|
| Example No. | 1 | 2 | 3 | 4 | 5 | 6 | 7 | 8 | 9 | 10 | 11 | 12 | 13 | 14 | 15 | 16 |
| Melt Temperature Inlet [°C.] | 283 | 283 | 283 | 283 | 265 | 265 | 265 | 275 | 275 | 275 | 265 | 265 | 265 | 275 | 275 | 275 |
| Temperature ZR80 [°C.] | 285 | 285 | 285 | 285 | 270 | 270 | 270 | 270 | 270 | 270 | 270 | 270 | 270 | 270 | 270 | 270 |
| Average Residence Time [min] | 33 | 33 | 52 | 52 | 33 | 33 | 33 | 33 | 33 | 33 | 52 | 52 | 52 | 52 | 52 | 52 |
| Screw Rpm [$min^{-1}$] | 8 | 12 | 8 | 12 | 12 | 18 | 24 | 12 | 18 | 24 | 12 | 18 | 24 | 12 | 18 | 24 |
| Intrinsic Viscosity [dl/g] | 0,758 | 0,783 | 0,837 | 0,850 | 0,745 | 0,758 | 0,764 | 0,743 | 0,758 | 0,761 | 0,781 | 0,805 | 0,805 | 0,800 | 0,817 | 0,826 |
| Acetaldehyde Content [ppm] | 31 | 12 | 11 | 11 | 17 | 4,0 | 3,8 | 4,6 | 4,0 | 3,7 | 4,0 | 12 | 12 | 26 | 17 | 4,2 |

EXAMPLES 17 TO 21

This series of tests was performed on a multi-screw extruder of the type MSE 40R×12D of Berstorff. In the processing chamber this machine has ten turning screw shafts rotating in the same direction and closely intermeshed with each other, which are seated oh both sides on planetary gears driven by a central shaft. There is the option of introducing an inert gas into the melt material upstream of the planetary gear on the inlet side.

The basis materials were pigment-free amorphous CoPET granules with 4 mol-% ε-caprolactone as the co-monomer. Furthermore, 156 ppm $Sb_2O_3$, 63 ppm $H_3PO_4$ and 85 ppm $Co(CH_3COO)_2$. 4 $H_2O$ were part of the formulation. Following crystallization and drying, these granules had an I.V. value of 0.589 dl/g and following melting am I.V. value of 0.581 dl/g prior to entering the MSE extruder reactor.

It is shown in Table 2 how the acetaldehyde content could be reduced to less than 10 ppm by controlling the process conditions (measured on the amorphous granules after the MSE). In the above examples, the maximal possibilities are not even fully explored. Thanks to the large free surface in the MSE reactor and with the aid of nitrogen (ratio 4 $m^3_n/t$), the required residence time for achieving bottle viscosity could be reduced to 15 minutes. The effect of high screw rpm on the acetaldehyde content became clearly visible.

Because of excessive shearing action above an optimal value, thermal damage occurs (Examples 17 and 19), in which cases the acetaldehyde content is too high.

TABLE 2

MSE Process Parameters and Granule Quality

| Example No. | 17 | 18 | 19 | 20 | 21 |
|---|---|---|---|---|---|
| Temperature [°C.] | 275 | 277 | 275 | 275 | 260 |
| Vacuum [mbar] | 0,5 | 1,0 | 0,1 | 0,1 | 0,1 |
| Average Residence Time [min] | 15 | 15 | 15 | 15 | 15 |
| Rpm Central Shaft [min$^{-1}$] | 40 | 30 | 39 | 21 | 21 |
| Rpm Screws [min$^{-1}$] | 73,6 | 55,2 | 71,8 | 38,6 | 38,6 |
| Nitrogen [yes, no] | yes | no | yes | yes | yes |
| Intrinsic Viscosity [dl/g] | 0.886 | 0,756 | 0847 | 0,834 | 0,819 |
| Acetaldehyde Content [ppm] | 31 | 15 | 30 | 11 | 8,4 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

We claim:

1. A condensation injection molding process for producing bottle preforms from the melt of polyethylene terephthalate or a copolyester thereof, wherein an inert gas is optionally introduced into a flow of the polyester melt from a poly-condensation, having an intrinsic viscosity between 0.5 and 0.75 dl/g, subsequently the melt is brought to an acetaldehyde content below 10 ppm, under vacuum at a temperature range between 285° to 260° C. in a melt post-condensation reactor and to an intrinsic viscosity of 0.75 to 0.95 dl/g, during a residence time of less than 60 min., and is immediately thereafter guided into an injection molding tool and processed into preforms.

2. A process in accordance with claim 1, wherein said copolyester contains maximally 10 mol-% of co-monomers.

3. A process in accordance with claim 2, wherein said co-monomers are selected from the group of consisting of lactones, isophthalic acid, naphthalene-2,6-dicarboxylic acid, 1,4cyclohexane dimethanol, diethylene glycol and mixtures thereof.

4. A process in accordance with claim 1, wherein temperature decreases during said residence time.

5. A process in accordance with claim 1, wherein the residence time in the reactor is less than 40 minutes.

6. A process in accordance with claim 1, wherein the melt is brought to an acetaldehyde content below 5 ppm.

7. A process in accordance with claim 1, wherein a screw reactor with at least two screw-shafts is used as the melt post-condensation reactor.

8. A process according to claim 1, comprising conveying the melt from the post-condensation reactor to the injection molding tool with a conveying device.

9. A process in accordance with claim 8, wherein a device with a double-piston system is employed as the conveying device.

10. A process in accordance with claim 1, wherein the vacuum is maintained below 1 mbar.

11. A process in accordance with claim 1, wherein carbon dioxide in a supercritical state or nitrogen is introduced as the inert gas.

12. A process according to claim 1, wherein said copolyester contains 2-5 mol-% of co-monomers.

13. A process in accordance with claim 12, wherein said co-monomers are selected from the group of consisting of lactones, isophthalic acid, naphthalene-2,6-dicarboxylic acid, 1,4-cyclohexane dimethanol, diethylene glycol and mixtures thereof.

14. A process in accordance with claim 13, wherein temperature decreases during said residence time.

15. A process in accordance with claim 14, wherein the residence time in the reactor is less than 40 minutes.

16. A process in accordance with claim 15, wherein a screw reactor with at least two screw-shafts is used as the melt post-condensation reactor.

17. A process according to claim 15, comprising conveying the melt from the post-condensation reactor to the injection molding tool with a conveying device.

18. A process in accordance with claim 17, wherein a device with a double-piston system is employed as the conveying device.

19. A process in accordance with claim 18, wherein the vacuum is maintained below 1 mbar.

20. A process in accordance with claim 19, wherein carbon dioxide in a supercritical state or nitrogen is introduced as the inert gas.

21. A preform produced in accordance with claim 1, wherein the acetaldehyde content of the preforms is maximally 10 ppm.

* * * * *